(12) United States Patent
Lee

(10) Patent No.: US 12,316,977 B2
(45) Date of Patent: May 27, 2025

(54) METHOD, APPARATUS, AND STORAGE MEDIUM FOR PROVIDING SLOW SHUTTER

(71) Applicant: SAMSUNG ELECTRONICS CO., LTD., Suwon-si (KR)

(72) Inventor: Changwoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 116 days.

(21) Appl. No.: 18/194,870

(22) Filed: Apr. 3, 2023

(65) Prior Publication Data

US 2023/0239576 A1    Jul. 27, 2023

Related U.S. Application Data

(63) Continuation of application No. PCT/KR2021/016403, filed on Nov. 11, 2021.

(30) Foreign Application Priority Data

Nov. 17, 2020  (KR) .................... 10-2020-0153281

(51) Int. Cl.
*H04N 23/72* (2023.01)
*G06T 3/40* (2006.01)
(Continued)

(52) U.S. Cl.
CPC .............. *H04N 23/72* (2023.01); *G06T 3/40* (2013.01); *G06T 5/50* (2013.01); *G06T 5/70* (2024.01);
(Continued)

(58) Field of Classification Search
None
See application file for complete search history.

(56) References Cited

U.S. PATENT DOCUMENTS

| 11,729,506 B2 * | 8/2023 | Sugawara | ............ H04N 23/61 348/208.2 |
| 2008/0088711 A1 * | 4/2008 | Border | .................. H04N 23/68 348/222.1 |

(Continued)

FOREIGN PATENT DOCUMENTS

| JP | 2014239396 A | 12/2014 |
| JP | 2017143492 A | 8/2017 |

(Continued)

OTHER PUBLICATIONS

International Search Report for PCT/KR2021/016403 mailed Feb. 17, 2022, 5 pages.

(Continued)

*Primary Examiner* — Cynthia Segura
(74) *Attorney, Agent, or Firm* — Nixon & Vanderhye, P.C.

(57) ABSTRACT

An example electronic device may include a memory, an image sensor, and at least one processor operatively connected to the memory and the image sensor, wherein the memory is configured to store instructions which, when executed by the at least one processor, cause the electronic device to acquire, through the image sensor, a plurality of images including first images having a first size and at least one second image having a second size larger than the first size, acquire a first synthesis image based on the first images, acquire a first moving object portion from the first synthesis image, based on synthesis area information including at least one of moving object location information or background location information, identify a second moving object portion in the at least one second image, based on the synthesis area information, and acquire a second synthesis image by replacing the second moving object portion by the first moving object portion, and other embodiments are possible.

15 Claims, 16 Drawing Sheets

(51) Int. Cl.
*G06T 5/50* (2006.01)
*G06T 5/70* (2024.01)
*G06T 7/20* (2017.01)
*G06T 7/70* (2017.01)
*H04N 7/01* (2006.01)

(52) U.S. Cl.
CPC .............. *G06T 7/20* (2013.01); *G06T 7/70* (2017.01); *H04N 7/013* (2013.01); *G06T 2207/20221* (2013.01)

(56) References Cited

U.S. PATENT DOCUMENTS

| | | | | |
|---|---|---|---|---|
| 2009/0225189 | A1* | 9/2009 | Morin | G03B 7/003 |
| | | | | 348/222.1 |
| 2010/0271498 | A1* | 10/2010 | Hwang | H04N 23/68 |
| | | | | 348/222.1 |
| 2011/0122291 | A1* | 5/2011 | Nakamura | H04N 1/32128 |
| | | | | 348/231.2 |
| 2013/0242121 | A1* | 9/2013 | Kashiwagi | H04N 25/67 |
| | | | | 348/208.4 |
| 2014/0325439 | A1* | 10/2014 | Sohn | G06F 3/04883 |
| | | | | 715/810 |
| 2015/0022698 | A1 | 1/2015 | Na et al. | |
| 2015/0262341 | A1* | 9/2015 | Nash | H04N 23/6845 |
| | | | | 348/208.6 |
| 2016/0366341 | A1 | 12/2016 | Li et al. | |
| 2017/0019608 | A1* | 1/2017 | Ono | H04N 23/76 |
| 2017/0237904 | A1 | 8/2017 | Takahashi | |
| 2018/0255232 | A1 | 9/2018 | Takahashi et al. | |
| 2020/0077019 | A1 | 3/2020 | Kim et al. | |
| 2020/0106945 | A1* | 4/2020 | Hsieh | G06T 11/60 |
| 2020/0228706 | A1 | 7/2020 | Park et al. | |
| 2021/0074002 | A1* | 3/2021 | Yang | G06T 7/254 |

FOREIGN PATENT DOCUMENTS

| | | |
|---|---|---|
| JP | 2017216627 A | 12/2017 |
| JP | 2018148272 A | 9/2018 |
| JP | 6624048 B2 | 12/2019 |
| KR | 20110005267 A | 1/2011 |
| KR | 101481798 B1 | 1/2015 |
| KR | 20150009184 A | 1/2015 |
| KR | 20200027276 A | 3/2020 |
| KR | 20200087401 A | 7/2020 |
| WO | 2015141487 A1 | 9/2015 |

OTHER PUBLICATIONS

Written Opinion of the ISA for PCT/KR2021/016403 mailed Feb. 17, 2022, 4 pages.
Office Action dated Aug. 23, 2024 in Korean Patent Application No. 10-2020-0153281 and English-language translation.

* cited by examiner

METHOD, APPARATUS, AND STORAGE MEDIUM FOR PROVIDING SLOW SHUTTER

CROSS-REFERENCE TO RELATED APPLICATIONS

This application is a continuation of International Patent Application No. PCT/KR2021/016403 designating the United States, filed on Nov. 11, 2021, in the Korean Intellectual Property Receiving Office, and claiming priority to Korean Patent Application No. 10-2020-0153281, filed on Nov. 17, 2020, in the Korean Intellectual Property Office. The disclosures of each of these applications are incorporated by reference herein in their entireties.

BACKGROUND

Field

The disclosure relates to a method and an apparatus for providing a slow shutter.

Description of Related Art

A compact system camera (CSC) may adjust parameters such as shutter speed, international organization for standardization (ISO), and aperture size of a camera for proper exposure in photography. A method for performing long-time photographing by adjusting parameters to express a trajectory of a moving object or a flow of an object may be referred to as a slow shutter.

To implement a slow shutter function, the CSC may perform a one-time readout after a long-time exposure by adjusting the aperture size.

SUMMARY

An existing slow shutter has been generally limited to professional photographers because shaking control should be performed for a long period of time (use of a tripod is essential) and knowledge on precise exposure control is required to obtain desired effects in various environments.

In order to obtain the desired slow shutter effect, a photographer should adjust the shutter speed and aperture from time to time depending on a photographing environment, and should perform consecutive photographing.

According to various embodiments, a slow shutter may be provided using an electronic device such as a smart phone that does not have a variable aperture.

According to various example embodiments, an electronic device may include a memory, an image sensor, and at least one processor operatively connected to the memory and the image sensor, wherein the memory is configured to store instructions which, when executed by the at least one processor, cause the electronic device to acquire, through the image sensor, a plurality of images including first images having a first size and at least one second image having a second size larger than the first size, acquire a first synthesis image based on the first images, acquire a first moving object portion from the first synthesis image, based on synthesis area information including at least one of moving object location information or background location information, identify a second moving object portion in the at least one second image, based on the synthesis area information, and acquire a second synthesis image by replacing the second moving object portion by the first moving object portion.

According to various example embodiments, a method for providing a slow shutter may include acquiring, through an image sensor, a plurality of images including first images having a first size and at least one second image having a second size larger than the first size, acquiring a first synthesis image based on the first images, acquiring a first moving object portion from the first synthesis image, based on synthesis area information including at least one of moving object location information or background location information, identifying a second moving object portion in the at least one second image, based on the synthesis area information, and acquiring a second synthesis image by replacing the second moving object portion by the first moving object portion.

According to various example embodiments, a non-transitory storage medium may store instructions, wherein the instructions are configured to, when executed by at least one processor, cause the at least one processor to perform at least one operation, the at least one operation including: acquiring, through an image sensor, a plurality of images including first images having a first size and at least one second image having a second size larger than the first size, acquiring a first synthesis image based on the first images, acquiring a first moving object portion from the first synthesis image, based on synthesis area information including at least one of moving object location information or background location information, identifying a second moving object portion in the at least one second image, based on the synthesis area information, and acquiring a second synthesis image by replacing the second moving object portion by the first moving object portion.

According to various example embodiments, a slow shutter function can be provided through short-time photographing, thereby improving a user's photographing capability.

According to various example embodiments, since a slow shutter function is provided based on the analysis of a motion of an object, it is possible to provide a proper brightness and slow shutter effect.

BRIEF DESCRIPTION OF THE DRAWINGS

The above and other aspects, features and advantages of certain embodiments of the present disclosure will be more apparent from the following detailed description, taken in conjunction with the accompanying drawings, in which.

DETAILED DESCRIPTION

Figure 1:
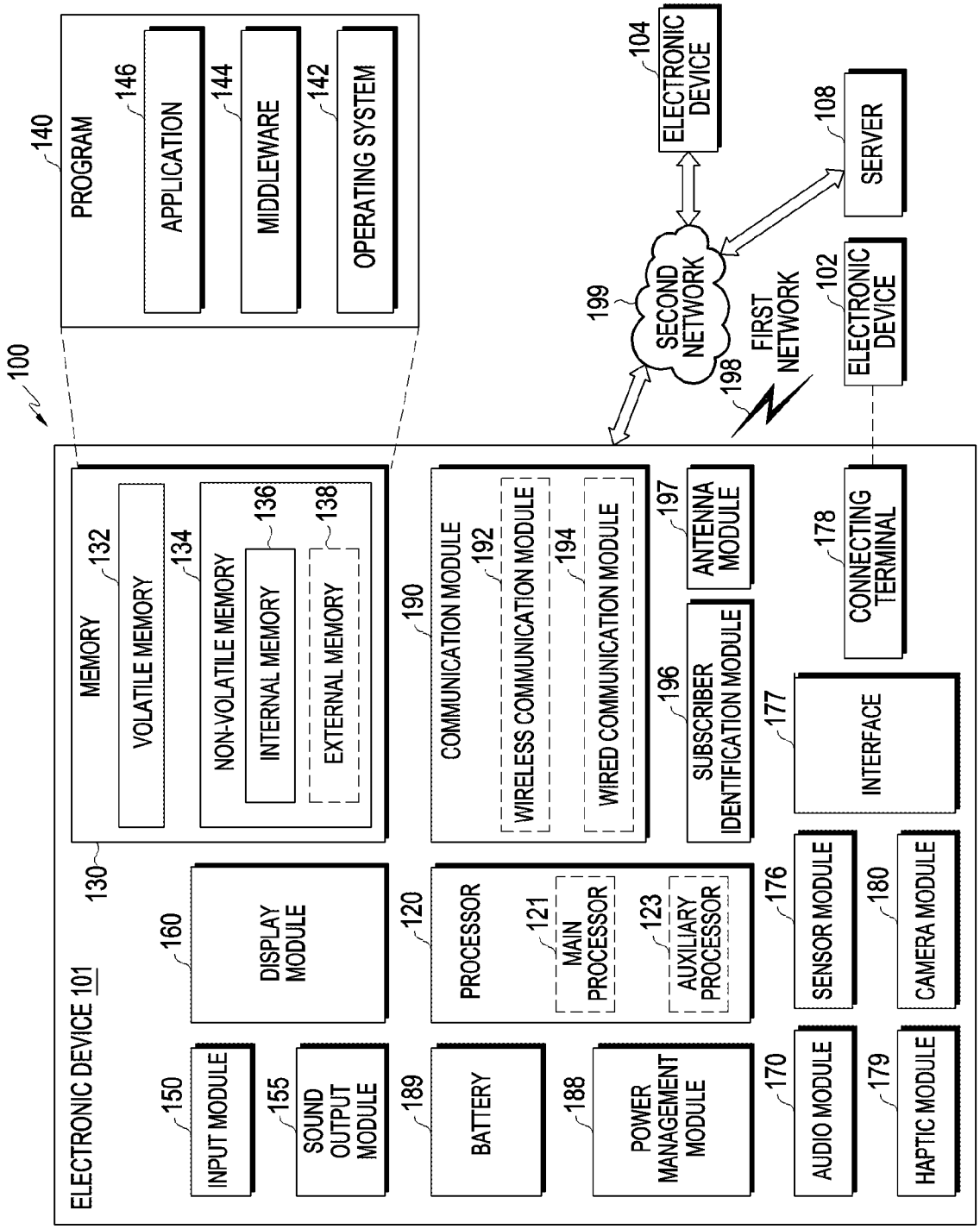
FIG. 1 is a block diagram of an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control, for example, at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active (e.g., executing an application) state. According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or an external electronic device (e.g., an electronic device 102 (e.g., a speaker or a headphone)) directly or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify or authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of or including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2A:
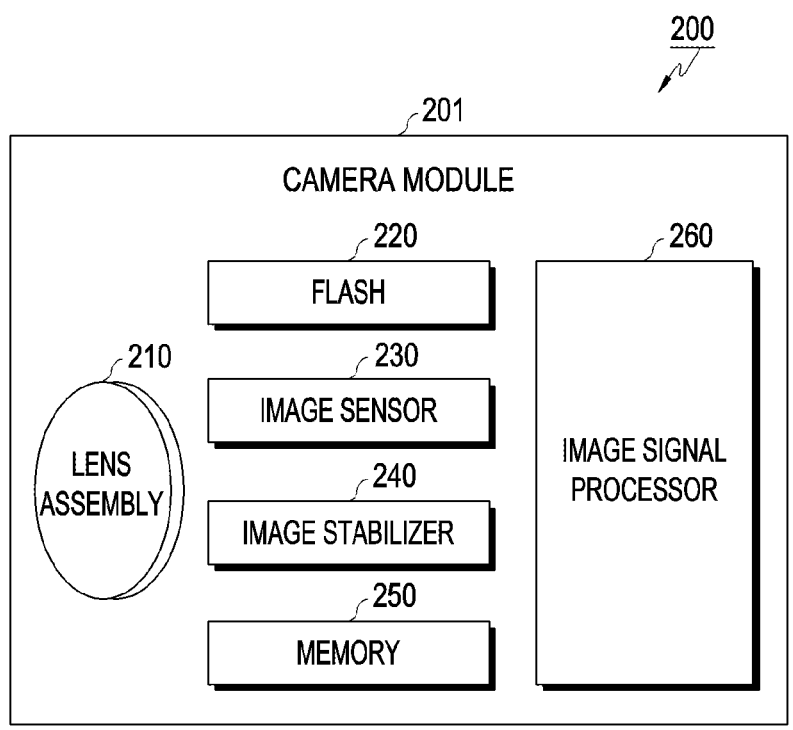
FIG. 2A is a block diagram illustrating an example of a camera module according to various embodiments.

FIG. 2A is a block diagram 200 illustrating the camera module 201 (e.g., the camera module 180 of FIG. 1) according to various embodiments. Referring to FIG. 2A, the camera module 201 may include a lens assembly 210, a flash 220, an image sensor 230, an image stabilizer 240, memory 250 (e.g., buffer memory), or an image signal processor (ISP) 260. The lens assembly 210 may collect light emitted or reflected from an object whose image is to be taken. The lens assembly 210 may include one or more lenses. According to various embodiments, the camera module 201 may include a plurality of lens assemblies 210. In such a case, the camera module 201 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to various embodiments, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal.

According to various embodiments, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 201 or the electronic device 201 including the camera module 201. This allows compensating for at least part of a negative effect (e.g., image blurring) by the movement on an image being captured. According to various embodiments, the image stabilizer 240 may sense such a movement by the camera module 201 or the electronic device 201 using a gyro sensor (not shown) or an acceleration sensor (not shown) disposed inside or outside the camera module 201. According to various embodiments, the image stabilizer 240 may be implemented, for example, as an optical image stabilizer.

The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display device 260. Thereafter, if a specified condition is met (e.g., by a user's input or system command), at least part of the raw image stored in the memory 250 may be obtained and processed, for example, by the image signal processor 260. According to various embodiments, the memory 250 may be configured as at least part of the memory 230 or as a separate memory that is operated independently from the memory 230.

The image signal processor 260 may perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control, read-out timing control, etc.) with respect to at least one (e.g., the image sensor 230) of the components included in the camera module 201. An image processed by the image signal processor 260 may be stored back in the memory 250 for further processing, or may be provided to an external component (e.g., the memory 230, the display device 230, the electronic device 202, the electronic device 204, or the server 208) outside the camera module 201. According to various embodiments, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display device 260 as it is or after being further processed.

According to various embodiments, the electronic device 101 may include a plurality of camera modules 201 having different attributes or functions. In such a case, at least one of the plurality of camera modules 201 may form, for example, a wide-angle camera and at least another of the plurality of camera modules 180 may form a telephoto camera. Similarly, at least one of the plurality of camera modules 201 may form, for example, a front camera and at least another of the plurality of camera modules may form a rear camera.

Figure 2B:
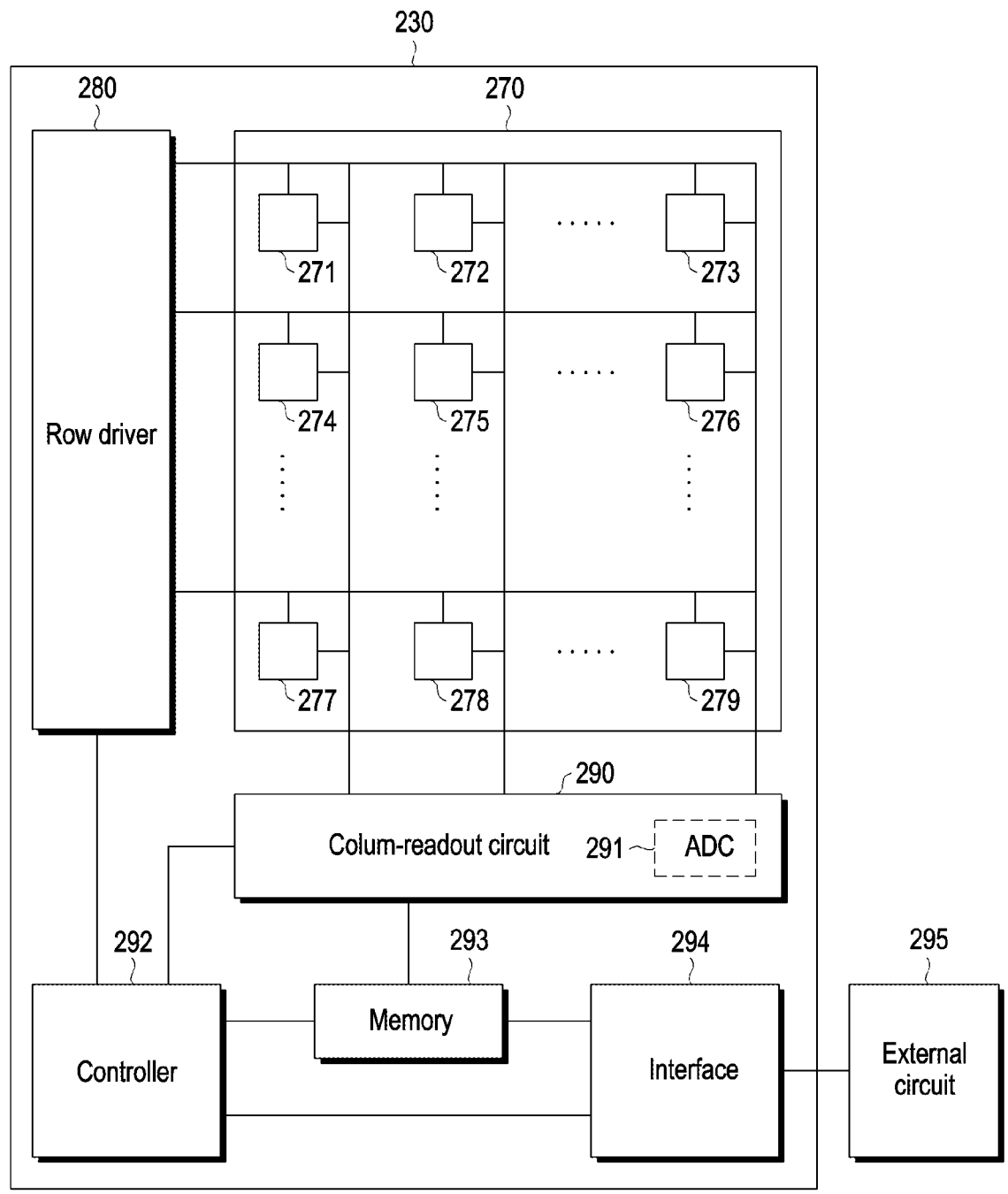
FIG. 2B is a block diagram illustrating a structure of an image sensor according to various embodiments.

FIG. 2B is a block diagram illustrating a structure of an example image sensor according to various embodiments.

According to an embodiment, the image sensor 230 may be an element of a camera module (e.g., the camera module 180 or the camera module 201) included in the electronic device 101.

Referring to FIG. 2B, the image sensor 230 according to various embodiments may include at least one of a pixel array 270, a row-driver 280, a column-readout circuit 290, a controller 292, a memory 293, or an interface 294.

The pixel array 270 may include a plurality of pixels (e.g., pixels 271 to 279). For example, the pixel array 270 may have a structure in which the plurality of pixels 271 to 279 are arranged in the form of an M*N matrix (M and N are natural numbers). The pixel array 270 in which the plurality of pixels 271 to 279 are arranged in an M*N two-dimensional form may include M rows and N columns. The pixel array 270 may include a plurality of photo-sensing elements, for example, such as photo diodes or pinned photo diodes. The pixel array 270 may sense light using a plurality of photo-sensing elements, and convert the light into an analog electrical signal to generate an image signal.

The row driver 280 (e.g., including row driver circuitry) may drive the pixel array 270 in units of rows. For example, the row driver 280 may output, to the pixel array 270, a transmission control signal for controlling a transmission transistor, a reset control signal for controlling a reset transistor, or a selection control signal for controlling a selection transistor of the plurality of pixels 271 to 279 included in the pixel array 270. The row-driver 280 may determine a row to be read out.

The column-readout circuit 290 may receive an analog electrical signal generated by the pixel array 270. For example, the column-readout circuit 290 may receive an analog electrical signal from a column line selected from among a plurality of columns constituting the pixel array 270. The column-readout circuit 290 may include an analog-to-digital converter (hereinafter, referred to as ADC) 291 capable of converting the analog electrical signal received from the selected column line into pixel data (or a digital signal) and outputting the same. Meanwhile, an operation in which the column-readout circuit 290 receives an analog electrical signal from the pixel array 270, and converts the received analog electrical signal into pixel data and outputs the same using the ADC 291 may be called "read out". The column-readout circuit 290 and the ADC 291 may determine a column to be read out.

The controller 292 (e.g., including controller circuitry) may be configured to acquire an image frame based on pixel data received from the column-readout circuit 290. The controller 292 may be configured to output the image frame to an external circuit 295 through the interface 294. According to an embodiment, the controller 292 may be configured to generate a transmission control signal for controlling a transmission transistor, a reset control signal for controlling a reset transistor, or a selection control signal for controlling a selection transistor of the plurality of pixels 271 to 279, and provide the generated signals to the row driver 280. In addition, the controller 292 may be configured to generate a selection control signal for selecting at least one column line among a plurality of column lines constituting the pixel array 270, and transmit the generated signal to the column-readout circuit 290. For example, the column-readout circuit 290 may enable some column lines among the plurality of column lines and disable the remaining column lines based on the selection control signal provided from the controller 292. In addition, the controller 292 may be implemented as a processor (e.g., the processor 120) including a central processing unit (CPU) or an application processor (AP), or as some kind of a block or module.

The memory 293 may include a volatile and/or a non-volatile memory. The memory 293 is a storage device provided inside the image sensor 230 and may include a buffer memory. According to an embodiment, the memory 293 may temporarily store a digital signal output from the column-readout circuit 290 or the controller 292. For example, the memory 293 may include at least one image frame obtained based on the light received by the pixel array 270. In addition, the memory 293 may store at least one digital signal received from the external circuit 295 through the interface 294.

According to an embodiment, the image sensor 230 may directly transfer the readout image frame to the external circuit 295 through the interface 294 without storing the readout image frame in the memory 293.

The interface 294 (e.g., including interface circuitry) may include, for example, an interface 177 or a communication module 190. The interface 294 may connect an element of the image sensor 230 such as the controller 292 or the memory 293 to the external circuit 295 in a wired or wireless manner. For example, the interface 294 may transfer at least one image frame stored in the memory 293 of the image sensor 230 to the external circuit 295 such as a memory (e.g., the memory 130) of the electronic device (e.g., the electronic device 101). In addition, the interface may transfer a control signal of the external circuit 295 such as the processor (e.g., the processor 120) of the electronic device (e.g., the electronic device 101) to the controller 292 of the image sensor 230.

According to an embodiment, the image sensor 230 may communicate with the external circuit 295 through the interface 294, for example, in a serial communication method. For example, the memory 293 of the image sensor 230 may communicate with the processor (e.g., the processor 120) of the electronic device (e.g., the electronic device 101) in an inter-integrated circuit (I2C) method.

According to an embodiment, the image sensor 230 may be connected to the external circuit 295 through the interface 294, for example, through an interface defined according to a mobile industry processor interface (MIPI) protocol. For example, the memory 293 of the image sensor 230 may communicate with the processor (e.g., the processor 120) of the electronic device (e.g., the electronic device 101) according to the interface defined according to the MIPI protocol.

Some or all of the above-described elements 270 to 295 may be included in the image sensor 230 as necessary, and each element may be configured in a singular or plural number.

Figure 3A:
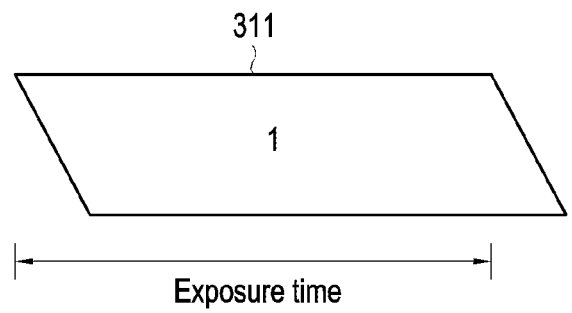
FIGS. 3A and 3B are diagrams illustrating a slow shutter function.
Figure 3B:
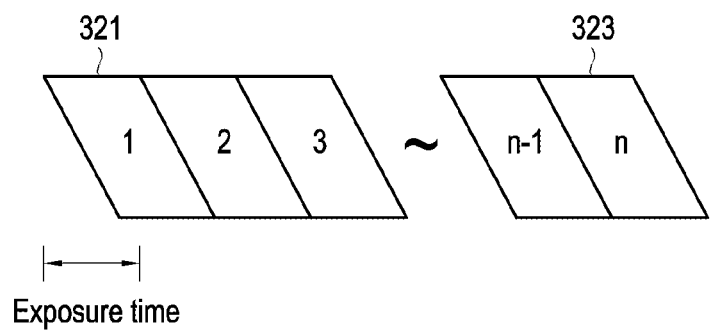

FIGS. 3A and 3B are diagrams illustrating an example slow shutter function.

Referring to FIG. 3A, in order to implement the slow shutter function, a CSC may output a first image 311 by performing a one-time read-out after a long time exposure by adjusting an aperture size.

Referring to FIG. 3B, in order to implement the slow shutter function, a camera without a variable aperture may perform read-out a plurality of times by applying the same exposure time, so as to output first to nth images 321 to 323. The electronic device including the camera may acquire an image obtained by synthesizing the first to nth images 321 and 323.

Figure 4:
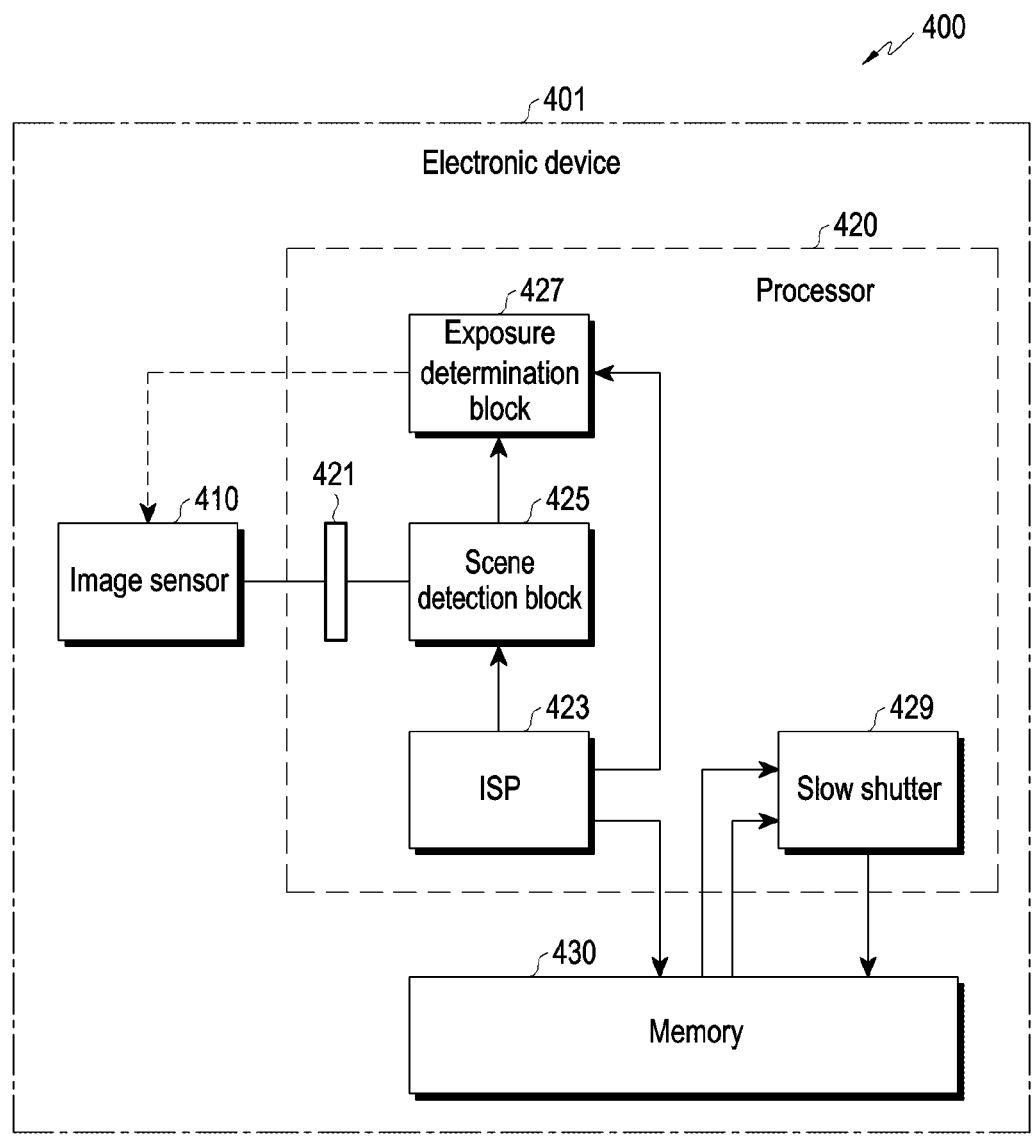
FIG. 4 is a block diagram of an electronic device according to various embodiments.

FIG. 4 is a block diagram 400 of an electronic device according to various embodiments.

An electronic device 401 may include an image sensor 410, a processor 420, and a memory 430.

According to various embodiments, the electronic device 401 may be implemented to include more or fewer elements, not being limited to the elements shown in FIG. 4. For example, the electronic device 401 may be implemented to further include the elements described above with reference to FIG. 1, 2A, or 2B. Terms such as 'block' used below refer, for example, to a unit for processing at least one function or operation which may be implemented as hardware or software, or a combination of hardware and software.

According to an embodiment, the image sensor 410 may be an element of a camera module (e.g., the camera module 180 or the camera module 201) included in the electronic device 401.

The image sensor 410 may output an electrical signal corresponding to light received from the outside. For example, the image sensor 410 may include a plurality of pixels each having a photodiode. The photodiode may receive light and may generate an analog electrical signal corresponding to the received light. Analog electrical signals generated from each of the plurality of photodiodes constituting the plurality of pixels may be converted into a plurality of pixel data. In this case, the converted plurality of pixel data may imply a pixel value corresponding to each of the plurality of pixels. A set of a plurality of pixel data acquired at a specific time point may constitute at least one image frame.

The image sensor 410 may output images according to a frame rate and/or image size corresponding to an operation mode. The image sensor 410 may output preview images having a second size (e.g., a full-size) at a preconfigured time interval in a preview mode. The image sensor 410 may output, in a slow shutter mode, first images having a first size (e.g., sub-size) at a first time interval, and output at least one second image having a second size at a second time interval that is wider than the first time interval. According to an embodiment, the image sensor 410 may determine/adjust a frame rate, a time interval, a resolution, or the number of the first images and/or the at least one second image according to control information received from the processor 420 or the exposure determination block 427. The first images having the first size may be referred to as binning images. According to an embodiment, the image sensor 410 may output preview images through a first path, and output the first images and/or at least one second image through a second path different from the first path.

The processor 420 (e.g., including processing circuitry) may be configured to, according to an operation mode, output images through a display (e.g., the display module 160), store the images in the memory 430, output an image obtained by synthesizing the images through the display, or store the synthesized image in the memory 430. The processor 420 may detect an event requiring a change of the operation mode. Based on the detection of the event, the processor 420 may be configured to control at least one element in the electronic device 401 to operate according to the changed operation mode. According to an embodiment, the event may include detection of a scene including a moving object (e.g., a fluid/flowing object, moving body, liquid, or gas) through the image signal processor 423, the scene detection block 425, or the like, or reception of a user input through the display module 160, the input module 150, or the like.

The processor 420 may include an interface 421, an image signal processor (ISP) 423, a scene detection block 425, an exposure determination block 427, and a slow shutter 429.

The interface 421 (e.g., including interface circuitry) may include, for example, an interface 177 or a communication module 190. The interface 421 may connect an element of the processor 420 such as the image signal processor 423 or the exposure determination block 427 to the image sensor 410 in a wired or wireless manner.

According to an embodiment, the processor 420 may communicate with the image sensor 410 through the interface 421, for example, using a serial communication method (e.g., an inter-integrated circuit (I2C) method).

The image signal processor 423 may receive images from the image sensor 410 through the interface 421. In a preview mode, the image signal processor 423 may receive preview images having a second size (e.g., a full size) from the image sensor 410 at a preconfigured time interval. In a slow shutter mode, the image signal processor 423 may receive first images having a first size (e.g., sub-size) from the image sensor 410 at a first time interval, and receive at least one second image having a second size from the image sensor 410 at a second time interval greater than the first time interval. The image signal processor 423 may store first images having a first size and at least one second image having a second size in the memory 430. According to an embodiment, the image signal processor 423 may discard images in which a motion of a moving object does not exist among the first images and store only images, in which the motion of the moving object exists, in the memory 430.

The image signal processor 423 may be configured to perform one or more image processing on the image acquired through the image sensor 410. The one or more image processing may include, for example, depth map generation, three-dimensional modeling, panorama generation, feature point extraction, image synthesis, or image compensation (e.g., noise reduction, resolution adjustment, brightness adjustment, blurring, sharpening, or softening).

The image signal processor 423 may store image-processed images in the memory 430. According to an embodiment, the image signal processor 423 may be configured to acquire, based on the first images and/or the at least one second image, synthesis area information (or may be referred to as a synthesis area map) including at least one of moving object location information (or may be referred to as location information on a moving object) or background location information (or may be referred to as location information on a background, a background portion or a background part). The image signal processor 423 may store the synthesis area information in the memory 430. According to an embodiment, the image signal processor 423 may output the synthesis area information to the scene detection block 425.

The scene detection block 425 may receive images from the image signal processor 423. The scene detection block 425 may identify a moving object area (or may be referred to as a moving object portion, a moving object part or an image portion including a moving object) including a moving object in the images, and acquire moving object information such as a moving speed and a moving direction. According to an embodiment, the scene detection block 425 may acquire the moving object information based on the synthesis area information received from the image signal processor 423. According to an embodiment, the scene detection block 425 may acquire, based on the first images and/or the at least one second image, synthesis area information including at least one of the moving object location information or the background location information. According to an embodiment, the moving object information may include vector values corresponding to a moving speed, a moving direction, or the like. According to an embodiment, the scene detection block 425 may downsize images received from the image signal processor 423 or receive downsized images from the image signal processor 423. The scene detection block 425 may detect a difference between the images by comparing the downsized images with each other. The scene detection block 425 may determine a moving speed, a moving direction, or the like, based on a difference between the images.

The exposure determination block 427 may receive moving object information from the scene detection block 425, and determine control information related to first images having a first size based on the moving object information. The exposure determination block 427 may output control information related to the first images to the image sensor 410. According to an embodiment, the exposure determination block 427 may output control information related to the at least one second image to the image sensor 410 together with or separately from the control information related to the first images. According to an embodiment, the control information related to the first images may include information on at least one of a frame rate, a time interval, a resolution, or the number of the first images. According to an embodiment, the control information related to the at least one second image may include information on at least one of a frame rate, a time interval, a resolution, or the number of the at least one second image.

The slow shutter 429 may be configured to, in a slow shutter mode, acquire first images having a first size stored in the memory 430, acquire a first synthesized image based on the first images, acquire a first moving object area (or may be referred to as a first moving object portion, a first moving object part or an image portion including a first moving object) from the first synthesized image based on the synthesis area information, identify a second moving object area (or may be referred to as a second moving object portion, a second moving object part or an image portion including a second moving object) in at least one second image based on the synthesis area information, and acquire a second synthesized image by replacing the second moving object by the first moving object area.

According to various example embodiments, an electronic device (e.g., the electronic device 101 or the electronic device 401) may include a memory (e.g., the memory 130 or the memory 430), and an image sensor (e.g., the image sensor 230 or the image sensor 410), and at least one processor (e.g., the processor 120 or the processor 420) operatively connected to the memory and the image sensor, wherein the memory may store instructions which are configured to, when executed by the at least one processor, cause the electronic device (or the at least one processor) to: acquire, through the image sensor, a plurality of images including first images having a first size and at least one second image having a second size larger than the first size; acquire a first synthesis image based on the first images; acquire a first moving object area from the first synthesis image, based on synthesis area information including at least one of moving object location information or background location information; identify a second moving object area in the at least one second image, based on the synthesis area information; and acquire a second synthesis image by replacing the second moving object area by the first moving object area.

According to various example embodiments, a frame rate of the first images may be higher than a frame rate of the at least one second image.

According to various example embodiments, the second synthesis image may include the first moving object area of the first synthesis image and a background area (or may be referred to as a background, a background portion, a background part or an image portion including the background) of the at least one second image.

According to various example embodiments, the instructions may be configured to, when executed, cause the at least one processor to upscale the first synthesis image, and acquire the first moving object area from the upscaled first synthesis image.

According to various example embodiments, the instructions may be configured to, when executed, cause the at least one processor to identify a moving object in at least one of the plurality of images.

According to various example embodiments, the instructions may be configured to, when executed, cause the at least one processor to identify at least one of a magnitude, speed, or direction of a motion of the moving object.

According to various example embodiments, the instructions may be configured to, when executed, cause the at least one processor to determine at least one of a frame rate, a time interval, a resolution, or the number of the first images to be used for generation of the first synthesis image, based on at least one of a magnitude, speed, or direction of a motion of the moving object.

According to various example embodiments, the instructions may be configured to, when executed, cause the at least one processor to provide information on at least one of a frame rate, a time interval, a resolution, or the number of the first images to the image sensor.

According to various example embodiments, the image sensor may be configured to provide the first images under the control of the at least one processor.

According to various example embodiments, the image sensor may be configured to provide at least a part of the first images during a duration of providing a preview image.

According to various example embodiments, the at least one second image may have the same size as that of the preview image.

According to various example embodiments, the image sensor may be configured to output an image frame including an image and a header or footer including information about the image.

According to various example embodiments, the at least one processor includes an image signal processor, and the image signal processor may be configured to change configuration related to image processing depending on whether an image to be processed is the first image or the second image.

According to various example embodiments, the image sensor may be configured to output an image frame including an image and a header or footer including information about the image, the at least one processor includes an image signal processor, and the image signal processor may be configured to identify whether the image corresponds to the first image or the second image based on the information about the image included in the header or footer, and change configuration related to processing of the image according to whether the image corresponds to the first image or the second image.

According to various example embodiments, the instructions may be configured to, when executed, cause the at least one processor to, while displaying a preview image, identify whether a slow shutter event requiring a change to a slow shutter mode requiring acquisition of the second synthesis image is detected, and display, on a display, a graphical object for selecting or changing at least one of a frame rate, a resolution, or the number of the first images, based on the detection of the slow shutter event.

According to various example embodiments, the instructions may be configured to, when executed, cause the at least one processor to, while displaying a preview image, identify whether a slow shutter event requiring a change to a slow shutter mode requiring acquisition of the second synthesis image is detected, and display, on a display, a graphical object for selecting or adjusting a value related to blur of the second synthesis image, based on the detection of the slow shutter event.

According to various example embodiments, the instructions may be configured to, when executed, cause the at least one processor to identify whether slow-shutter photographing is selected, and acquire, based on the selection of the slow-shutter photographing, a plurality of images including the first images and the at least one second image.

According to various example embodiments, the instructions may be configured to, when executed, cause the at least one processor to display, on a display, a graphic object for selecting or changing at least one of a frame rate, a resolution, or the number of the first images to be used for generation of the first synthesis image according to transition to a slow shutter mode requiring acquisition of the second synthesis image.

Figure 5:
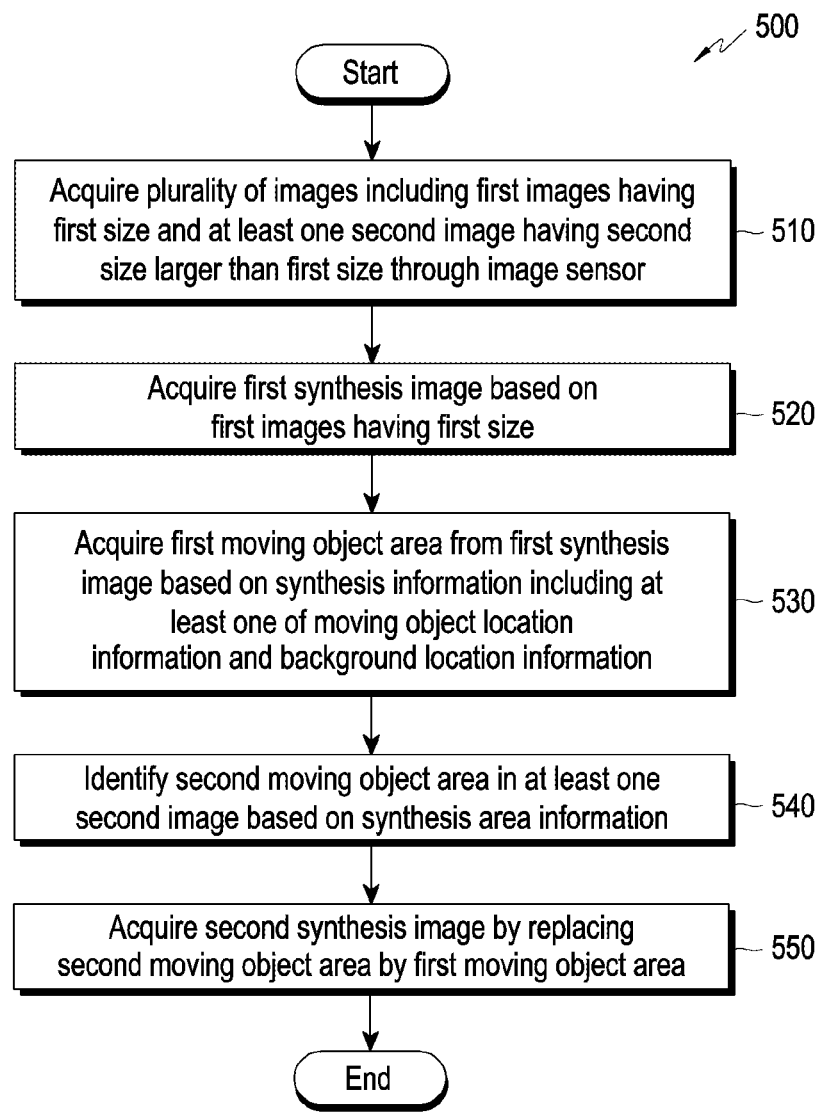
FIG. 5 is a flowchart illustrating an example method for providing a slow shutter according to various embodiments.

FIG. 5 is a flowchart 500 illustrating an example method for providing a slow shutter according to various embodiments. According to various embodiments, the operations illustrated in FIG. 5 are not limited to the illustrated sequence and may be performed in various sequences. According to various embodiments, more operations than those illustrated in FIG. 5 or at least one operation fewer than thereof may be performed.

Referring to FIG. 5, an electronic device (e.g., the electronic device 101 or the electronic device 401) or at least one processor (e.g., the processor 120 or the processor 420) may be configured to perform at least one of operations 510, 520, 530, 540, and 550.

In operation 510, the electronic device may be configured to acquire a plurality of images including first images having a first size and at least one second image having a second size larger than the first size through an image sensor (e.g., the image sensor 230 or the image sensor 410).

According to an embodiment, the electronic device may be configured to identify a moving object from at least one of the plurality of images, identify at least one of a magnitude, speed, or direction of a motion of the moving object, determine at least one of a frame rate, a time interval, a resolution, or the number of first images to be used for acquisition of the first synthesis image based on at least one of the magnitude, speed, or direction of the motion of the moving object, and provide information on at least one of the frame rate, the time interval, the resolution, or the number of first images to an image sensor. The image sensor may be configured to provide the first images under control of the at least one processor. The image sensor may be configured to provide at least a part of the first images during a duration in which preview images are provided. The at least one second image may have the same size as that of the preview image. The at least one second image may be a part of the preview images.

According to an embodiment, a frame rate of the first images may be higher than a frame rate of the at least one second image.

According to an embodiment, the electronic device may be configured to, according to transition to the slow shutter mode requiring acquisition of a second synthesis image, display, on a display, a graphic object for selecting or changing at least one of a frame rate, a time interval, a resolution, or the number of the first images to be used for acquisition of a first synthesis image.

In operation 520, the electronic device may be configured to acquire a first synthesis image based on the first images having a first size.

In operation 530, the electronic device may be configured to obtain a first moving object area from the first synthesis image based on synthesis area information including at least one of moving object location information or background location information.

According to an embodiment, the electronic device may be configured to upscale the first synthesis image and acquire the first moving object area from the upscaled first synthesis image.

In operation 540, the electronic device may be configured to identify a second moving object area from the at least one second image based on the synthesis area information.

In operation 550, the electronic device may be configured to acquire a second synthesis image by replacing the second moving object area by the first moving object area.

According to an embodiment, the second synthesis image may include the first moving object area of the first synthesis image and a background area of the at least one second image.

Figure 6:
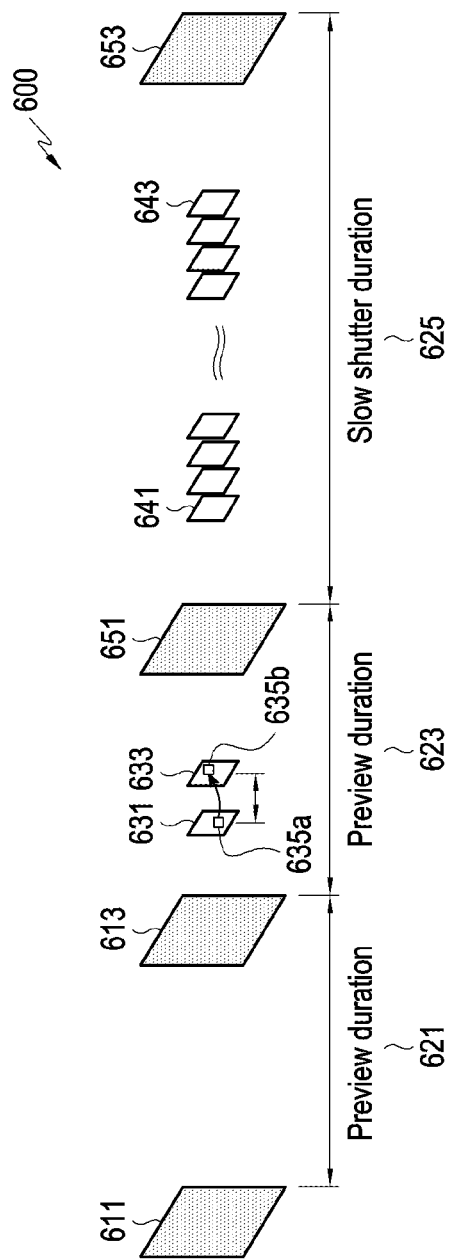
FIG. 6 is a diagram illustrating an example operation of acquiring images in a slow shutter mode according to various embodiments.

FIG. 6 is a diagram 600 illustrating an example operation of acquiring images in a slow shutter mode according to various embodiments. The operation illustrated in FIG. 6 may be performed by an electronic device (e.g., the electronic device 101 or the electronic device 401) or at least one processor (e.g., the processor 120 or the processor 420).

The electronic device may be configured to output preview images 611 and 613 having a second size (e.g., the full size) at a preconfigured time interval in a preview mode. In the preview mode, for example, the electronic device may be configured to detect an event (i.e., a slow shutter event) requiring a change to a slow shutter mode during a first preview duration 621. According to an embodiment, the event may include detection of a scene including a moving object through the image signal processor 423, the scene detection block 425, or the like, or reception of a user input through the display module 160, the input module 150, or the like.

In response to detecting the slow shutter event, the electronic device may be configured to, in the preview mode, for example, during a second preview duration 623, identify a moving object area including moving objects 635a and 635b from images 631 and 633 having a first size (e.g., sub-size) smaller than the second size, and acquire moving object information such as a moving speed and a moving direction. The electronic device may be configured to determine, based on the moving object information, control information related to the first images 641 and 643 having the first size. According to an embodiment, the electronic device may be configured to determine, based on the moving object information, control information related to the at least one second image 651 and 653. According to an embodiment, the control information may include a frame rate, a time interval, a resolution, or number of the first images 641 and 643 and/or the at least one second image 651 and 653.

The electronic device may be configured to, in the slow shutter mode, for example, during a slow shutter duration 625, output first images 641 and 643 having a first size at a first time interval, and output at least one second image 651 or 653 having a second size at a second time interval greater than the first time interval.

The electronic device may be configured to perform translational (2D) motion correction on the at least one second image 651 or 653 in order to compensate for motion caused by hand shake and, when a time interval between the at least one second image is equal to or greater than the threshold value, perform rotation, pitch, and yaw axis correction.

According to an embodiment, the first images 641 and 643 may be output from an image sensor (e.g., the image sensor 230 or the image sensor 410) for up to 24 ms. Since the first images 641 and 643 of up to 35 frames, which are output for 24 ms may be motion-matched by an image stabilizer in the camera module, the electronic device may be configured not to perform separate motion matching for the first images 641 and 643.

Figure 7:
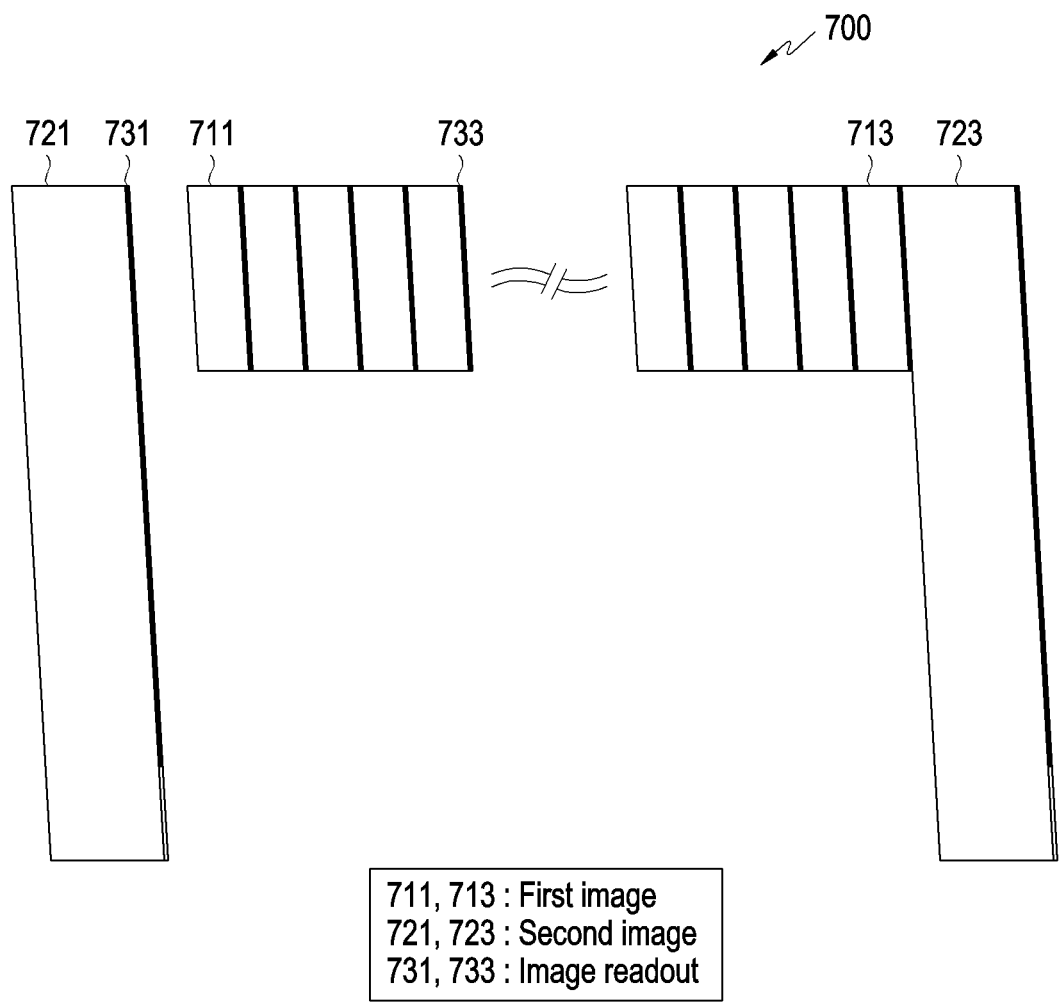
FIG. 7 is a diagram illustrating an example of a first image and a second image according to various embodiments.

FIG. 7 is a diagram 700 for illustrating an example of a first image and a second image according to various embodiments.

Referring to FIG. 7, an image sensor (e.g., the image sensor 230 or the image sensor 410) may perform image exposure and readout 731 and 733 based on control information received from a processor (e.g., the processor 120 or the processor 420) or an exposure determination block (e.g., the exposure determination block 427)), so as to output first images 711 and 713 having a first size (e.g., sub-size) and second images 721 and 723 having a second size (e.g., a full size). As the size (and/or resolution) of the first images 711 and 713 decreases, the image sensor may output a greater number of the first images 711 and 713 for a unit time. The processor or scene detection block 425 may determine the size (and/or resolution) of the first images 711 and 713 based on the amount/degree/level of blur required for the synthesis image. The blur may consecutively represent a motion (or a trajectory of a motion) of a moving object.

Figure 8:
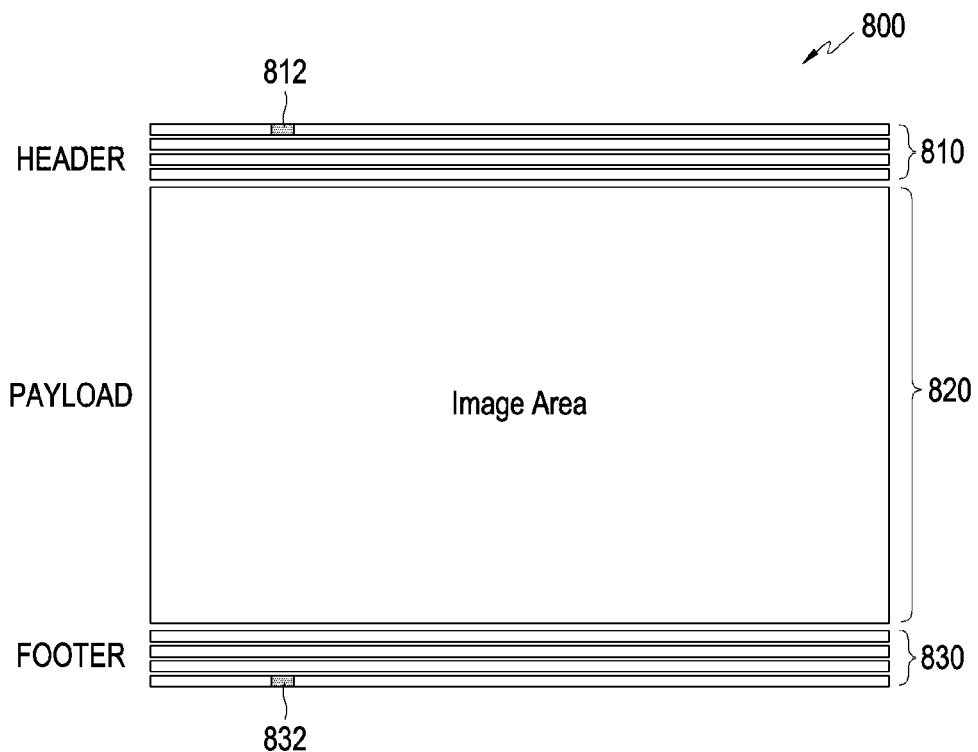
FIG. 8 is a diagram illustrating an example of the configuration of an image frame according to various embodiments.

FIG. 8 is a diagram illustrating an example of the configuration of an image frame 800 according to various embodiments.

The image frame 800 may include a header 810, a payload 820, and a footer 830.

An image sensor (e.g., the image sensor 230 or the image sensor 410) may output images having various sizes/resolutions. In order for a processor (e.g., the processor 120 or the processor 420) to adaptively process an image having a variable size/resolution, the image sensor may include, in the header 810 and/or the footer 830, information about an image included in the payload 820.

According to an embodiment, the header 810 may include information 812 on an image in a current image frame, and the footer 830 may include information 832 on an image in an image frame.

Figure 9:
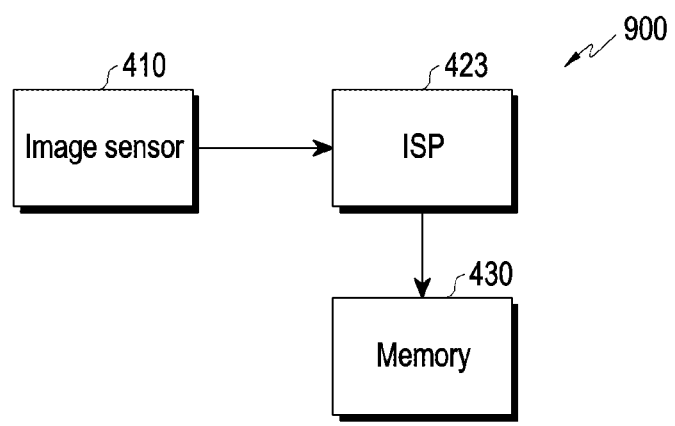
FIG. 9 is a diagram illustrating an example operation of an image signal processor according to various embodiments.

FIG. 9 is a diagram 900 illustrating an example operation of an image signal processor according to various embodiments.

An image sensor 410 may output images having various sizes/resolutions at various frame rates.

When the size/resolution/frame rate of consecutively input images is variable, an image signal processor 423 may adaptively process the image. According to an embodiment, when a first image having a first size (e.g., sub-size) is input, the image signal processor 423 may be configured not to perform exposure and color-related operations, such as auto focus (AF)/auto white balance (AWB)/auto exposure (AE), and may perform configuration/parameter changes for buffer allocation required when the first image is stored in the memory 430. In a case that a second image having a second size (e.g., full size) is input, the image signal processor 423 may be configured to perform exposure and color-related operation such as auto focus (AF)/auto white balance (AWB)/auto exposure (AE), and may perform configuration/parameter changes for buffer allocation required when the second image is stored in the memory 430. The image sensor 410 outputs an image frame in real time, and the image signal processor 423 may be configured to process the current image frame/image in real time according to the configuration/parameter configured/changed in real time, by referring to a header and/or footer of a current or previous image frame.

Figure 10A:
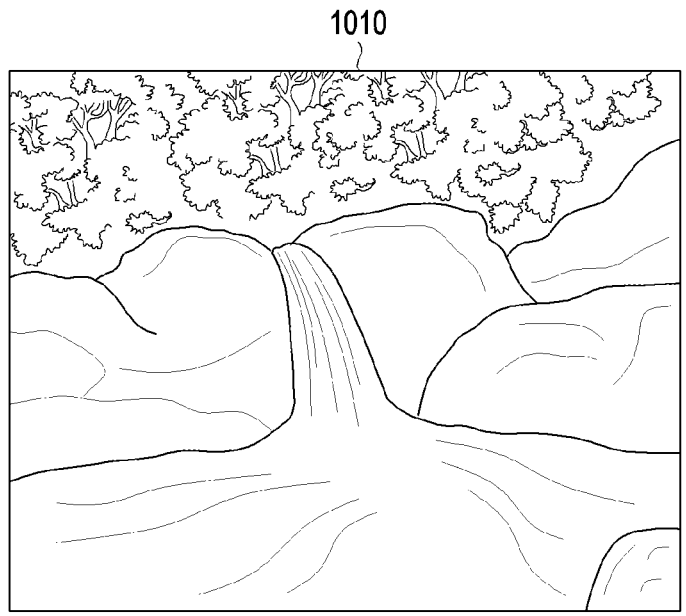
FIGS. 10A, 10B, and 10C are diagrams illustrating an example operation of acquiring synthesis area information according to various embodiments.
Figure 10B:
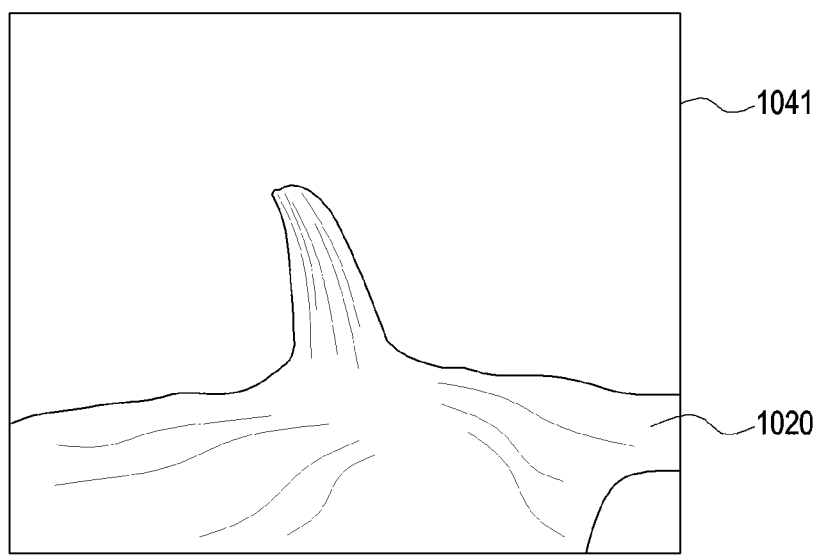
Figure 10C:
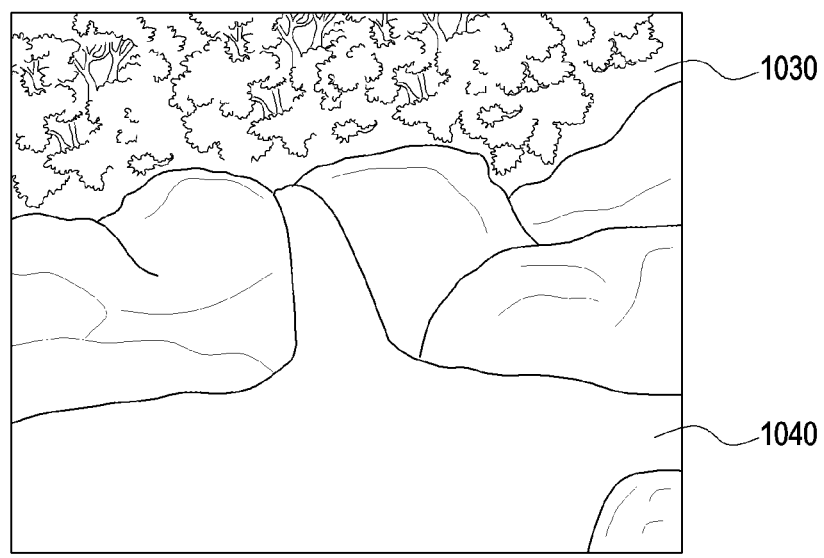

FIGS. 10A, 10B, and 10C illustrate an example operation of acquiring synthesis area information according to various embodiments.

Referring to FIG. 10A, a processor (e.g., the processor 120 or the processor 420) (or an image signal processor (e.g., the image signal processor 260 or the image signal processor 423) or a scene detection block 425) may receive an image 1010 from an image sensor (e.g., the image sensor 230 or the image sensor 410).

The processor may be configured to identify, in the image 1010, a moving object area 1020 including a moving object as shown in FIG. 10B and/or a background area 1030 including a fixed background as shown in FIG. 10C.

The processor may be configured to obtain synthesis area maps 1041 and 1043 or synthesis area information including location information of the moving object area 1020 and/or location information of the background area 1030. The processor may be configured to store the synthesis area information or the synthesis area maps 1041 and 1043 in a memory (e.g., the memory 130 or the memory 430). According to an embodiment, the location information of the moving object area 1020 may include location information or indexes of image pixels belonging to the moving object area 1020, and the location information of the background area 1030 may include location information or indexes of image pixels belonging to the background area 1030.

Figure 11:
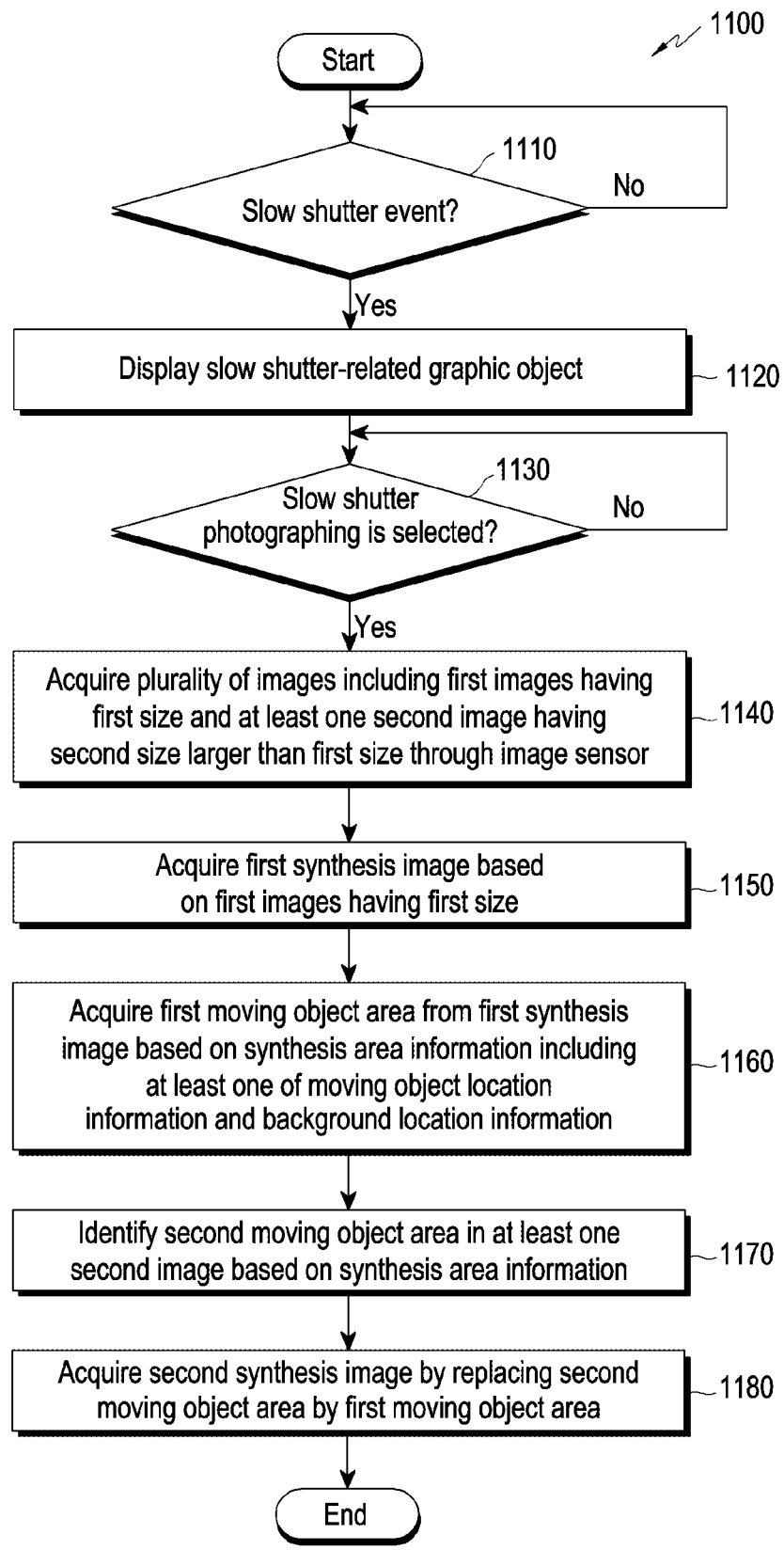
FIG. 11 is a flowchart illustrating an example method for providing a slow shutter according to various embodiments.

FIG. 11 is a flowchart 1100 illustrating an example method for providing a slow shutter in accordance with various embodiments. According to various embodiments, the operations illustrated in FIG. 11 are not limited to the illustrated sequence and may be performed in various sequences. According to various embodiments, more operations than those illustrated in FIG. 11, or at least one operation fewer than thereof may be performed.

Referring to FIG. 11, an electronic device (e.g., the electronic device 101 or the electronic device 401) or at least one processor (e.g., the processor 120 or the processor 420) may perform at least one of operations 1110 to 1180.

In operation 1110, the electronic device may be configured to identify whether a slow shutter event requiring a change to the slow shutter mode is detected. Based on the detection of the slow shutter event, the electronic device may be configured to control at least one element in the electronic device 401 to operate according to the slow shutter mode. According to an embodiment, the slow shutter event may include detection of a scene including a moving object through the image signal processor 423, the scene detection block 425, or the like, or reception of a user input through the display module 160, the input module 150, or the like. The electronic device may perform operation 1120 when the slow shutter event is detected, and perform operation 1110 when the slow shutter event is not detected. According to an embodiment, the electronic device may be configured to, while displaying a preview image, identify whether a slow shutter event requiring a change to the slow shutter mode is detected.

In operation 1120, based on the detection of the slow shutter event, the electronic device may display, on a display, a graphic object for selecting or changing at least one of a frame rate, a resolution, or the number of first images to be used for generating the first synthesis image. According to an embodiment, the graphic object may indicate the amount/degree/level of blur required for the final synthesis image. The user may select/adjust the desired amount/degree/level of blur using a graphic object.

In operation 1130, the electronic device may be configured to identify whether slow-shutter photographing is selected. According to an embodiment, the selection of slow-shutter photographing may be implemented through a touch/hover input through a display (e.g., the display module 160), a button input through an input module (e.g., the input module 150), a voice input through a microphone, or the like. When the selection of slow shutter photographing is identified, the electronic device may be configured to perform operation 1140, and when the selection of slow shutter photographing is not identified, the electronic device may be configured to perform operation 1130.

Operations 1140, 1150, 1160, 1170, and 1180 may be performed in the same manner as operations 510 to 550 described above, and thus a redundant description will not be repeated.

According to various example embodiments, an electronic device (e.g., the electronic device 101 or the electronic device 401) may include a memory (e.g., the memory 130 or the memory 430), and an image sensor (e.g., the image sensor 230 or the image sensor 410), and at least one processor (e.g., the processor 120 or the processor 420) operatively connected to the memory and the image sensor, wherein the memory may store instructions which are configured to, when executed by the at least one processor, cause the electronic device (or the at least one processor) to the example method for providing the slow shutter as illustrated in FIG. 11.

According to various example embodiments, a method for providing a slow shutter by an electronic device (e.g., the electronic device 101 or the electronic device 401) may include acquiring, through an image sensor (e.g., the image sensor 230 or the image sensor 410), a plurality of images including first images having a first size and at least one second image having a second size larger than the first size, acquiring a first synthesis image based on the first images, acquiring a first moving object area from the first synthesis image, based on synthesis area information including at least one of moving object location information or background location information, identifying a second moving object area in the at least one second image, based on the synthesis area information, and acquiring a second synthesis image by replacing the second moving object area by the first moving object area.

According to various example embodiments, a frame rate of the first images may be higher than a frame rate of the at least one second image.

According to various example embodiments, the second synthesis image may include the first moving object area of the first synthesis image and a background area of the at least one second image.

According to various example embodiments, the method may further include upscaling the first synthesis image, and acquiring the first moving object area from the upscaled first synthesis image.

According to various example embodiments, the method may further include identify a moving object in at least one of the plurality of images.

According to various example embodiments, the method may further include identifying at least one of a magnitude, speed, or direction of a motion of the moving object.

According to various example embodiments, the method may further include determining at least one of a frame rate, a time interval, a resolution, or the number of the first images to be used for generation of the first synthesis image, based on at least one of a magnitude, speed, or direction of a motion of the moving object.

According to various example embodiments, the method may further include providing information on at least one of a frame rate, a time interval, a resolution, and the number of the first images to the image sensor.

According to various example embodiments, the image sensor may be configured to provide the first images under the control of the at least one processor.

According to various example embodiments, the image sensor may be configured to provide at least a part of the first images during a duration of providing a preview image.

According to various example embodiments, the at least one second image may have the same size as that of the preview image.

According to various example embodiments, the image sensor may be configured to output an image frame including an image and a header or footer including information about the image.

According to various example embodiments, the electronic device includes an image signal processor, and the image signal processor may be configured to change configuration related to image processing depending on whether an image to be processed is the first image or the second image.

According to various example embodiments, the image sensor may be configured to output an image frame including an image and a header or footer including information about the image, and the image signal processor may be configured to identify whether the image corresponds to the first image or the second image based on the information about the image included in the header or footer, and change a configuration related to processing of the image according to whether the image corresponds to the first image or the second image.

According to various example embodiments, the method may further include, while displaying a preview image, identifying whether a slow shutter event requiring a change to a slow shutter mode requiring acquisition of the second synthesis image is detected, and displaying, on a display, a graphical object for selecting or changing at least one of a frame rate, a resolution, or the number of the first images, based on the detection of the slow shutter event.

According to various example embodiments, the method may further include, while displaying a preview image, identifying whether a slow shutter event requiring a change to a slow shutter mode requiring acquisition of the second synthesis image is detected, and displaying, on a display, a graphical object for selecting or adjusting a value related to blur of the second synthesis image, based on the detection of the slow shutter event.

According to various example embodiments, the method may further include identifying whether slow-shutter photographing is selected, and acquiring, based on the selection of the slow-shutter photographing, a plurality of images including the first images and the at least one second image.

According to various example embodiments, the method may further include displaying, on a display, a graphic object for selecting or changing at least one of a frame rate, a resolution, or the number of the first images to be used for generation of the first synthesis image according to transition to a slow shutter mode requiring acquisition of the second synthesis image.

Figure 12A:
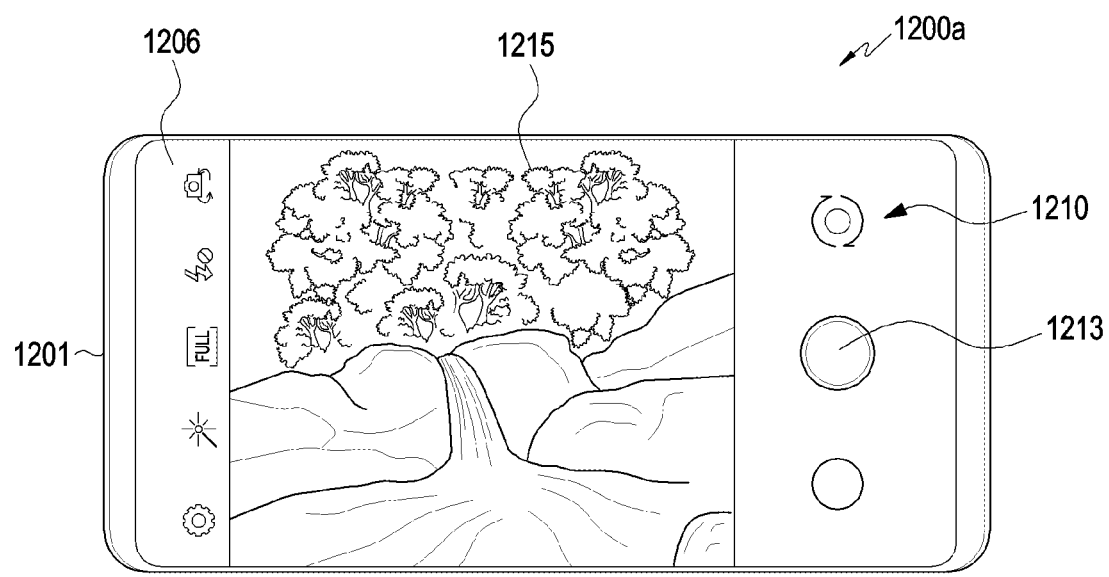
FIGS. 12A and 12B are diagrams illustrating an example slow shutter mode according to various embodiments.
Figure 12B:
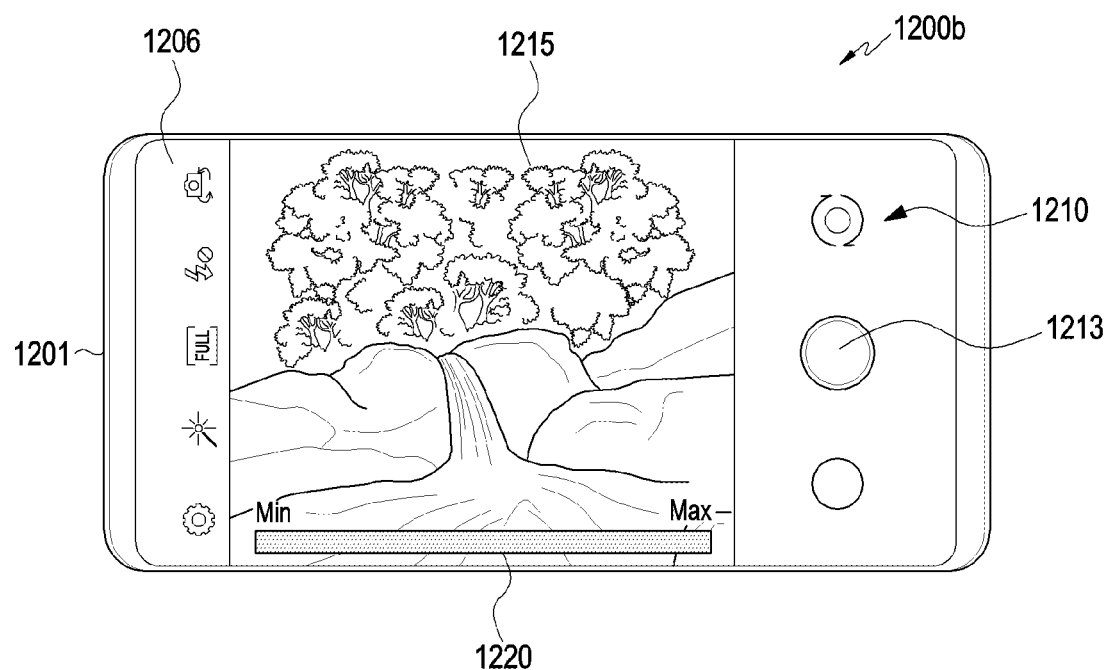

FIGS. 12A and 12B are diagrams 1200a to 1200b illustrating a slow shutter mode according to various embodiments.

Referring to FIG. 12A, an electronic device 1201 (e.g., the electronic device 101 or the electronic device 401) may display a camera interface 1210 for capturing an image on a display 1206 (e.g., the display module 160). The camera interface 1210 may include a capture button 1213 for recording a still/moving image and a preview image 1215 captured by a rear camera of the electronic device 1201. The electronic device 1201 may detect a slow shutter event requiring a change to the slow shutter mode. According to an embodiment, the slow shutter event may include detection of a scene including a moving object through the image signal processor 423, the scene detection block 425, or the like, or reception of a user input through the display module 160, the input module 150, or the like.

Referring to FIG. 12B, the electronic device 1201 may display, on a display 1206, a graphic object 1220 for changing at least one of a frame rate, a resolution, or the number of first images to be used for generating a first synthesis image, based on detection of a slow shutter event. According to an embodiment, the graphic object 1220 may indicate the amount/degree/level of blur (or the amount/time of exposure) required for a final synthesis image. A user may select/adjust a desired blur amount/degree/level (or the amount/time of exposure) using the graphic object 1220. For example, the user may select a blur amount/degree/level ranging from a maximum blur amount/degree/level to a minimum blur amount/degree/level through a swipe gesture on the graphic object 1220. According to an embodiment, the electronic device 1201 may display, instead of the preview image 1215, a pre-stored image or a temporary synthesis image corresponding to the amount/degree/level of blur (or the amount/time of exposure) selected through the graphic object 1220. For example, the temporary synthesis image may be discarded if there is no subsequent preconfigured operation (e.g., if the capture button 1213 is not selected (for a preconfigured time)).

In response to selection of the photographing button 1213, the electronic device 1201 may be configured to permanently store the temporary synthesis image or the newly generated final synthesis image in a memory (e.g., the memory 130 or the memory 430).

According to another embodiment, the electronic device 1201 may be configured to automatically select a blur amount/degree/level (or the amount/time of exposure) required for the final synthesis image, based on the detection of the slow shutter event. The electronic device 1201 may select a blur amount/degree/level (or the amount/time of exposure) based on the motion magnitude and/or speed of the moving object. The electronic device 1201 may increase the blur amount/degree/level (or the amount/time of exposure) when the motion magnitude and/or speed of the moving object is large (e.g., greater than a threshold value), and may decrease the blur amount/degree/level (or the amount/time of exposure) when the motion magnitude and/or speed of the moving object is small (e.g., smaller than a threshold value).

Figure 13:
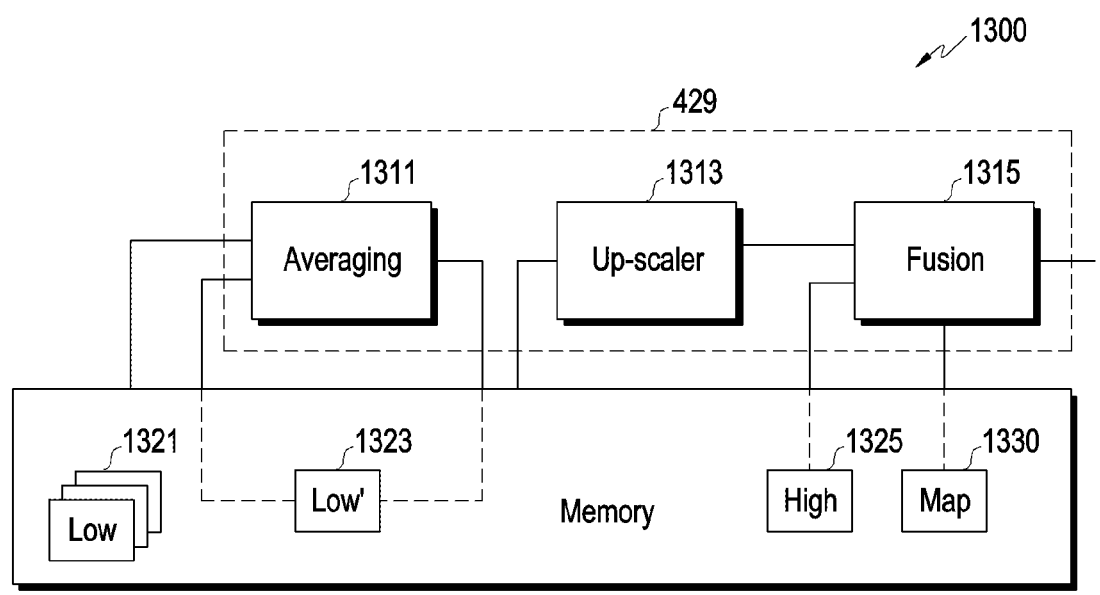
FIG. 13 is a diagram illustrating an example operation of a slow shutter according to various embodiments.

FIG. 13 is a diagram 1300 illustrating an example operation of a slow shutter according to various embodiments.

A slow shutter 429 may include an averaging block 1311, an up-scaler 1313, and a fusion block 1315.

The averaging block 1311 may obtain a first synthesis image 1323 by performing average synthesis in the time-axis direction with respect to first images 1321 having a first size (e.g., sub-size) stored in the memory 430. For example, a pixel value at each position of the first synthesis image 1323 may be determined as an average value of pixel values at the position of the first images 1321.

According to an embodiment, the averaging block 1311 may acquire a first synthesis image 1323 by performing average synthesis on the first images 1321 in which the magnitude of a motion of the moving object is equal to or greater than a preconfigured threshold value.

According to an embodiment, a temporal directional low pass filter (LPF) may be applied to the first images 1321 input to the averaging block 1311.

The up-scaler 1313 may upscale the first synthesis image 1323 to a second size (e.g., a full size).

The fusion block 1315 may acquire a first moving object area from the upscaled first synthesis image based on a synthesis area map 1330. The fusion block 1315 may identify a second moving object area in the at least one second image 1325 having a second size stored in the memory 430, based on the synthesis area map 1330, and may acquire a second synthesis image by replacing the second moving object area by the first moving object area.

According to an embodiment, the slow shutter 429 may perform image synthesis on the 240 first images 1321 and 10 second images 1325, which are captured for 330 ms by an image sensor (e.g., the image sensor 230 or the image sensor 410).

Figure 14A:
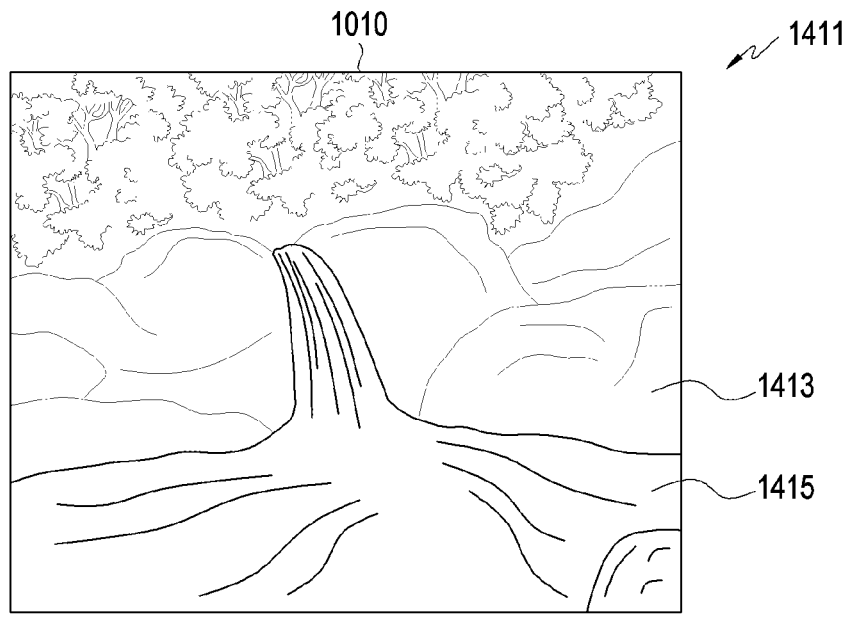
FIGS. 14A, 14B, and 14C are diagrams illustrating an example image synthesis operation according to various embodiments.
Figure 14B:
Figure 14C:
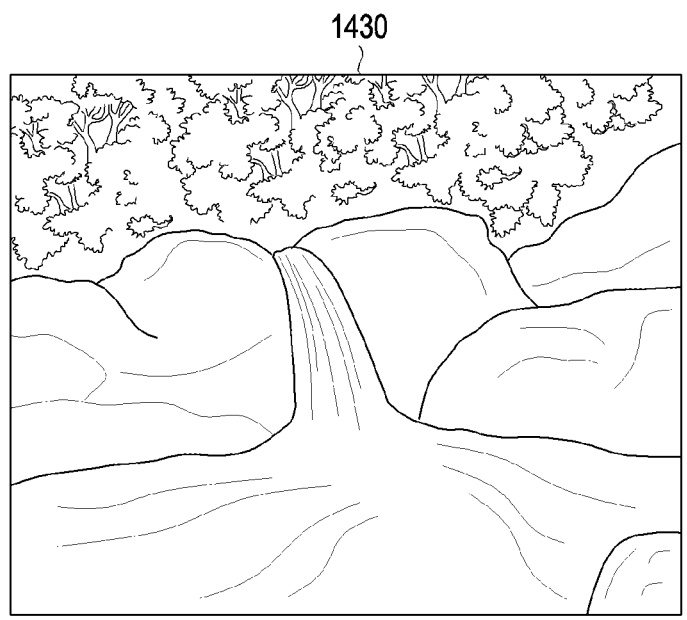

FIGS. 14A, 14B, and 14C are diagrams illustrating an example image synthesis operation according to various embodiments.

Referring to FIG. 14A, an electronic device (e.g., the electronic device 101 or the electronic device 401) (or the slow shutter 429) may be configured to acquire, based on the synthesis area information/map, a first moving object area 1415 distinguished from a background area 1413 from a first synthesis image 1411 upscaled from a first size (e.g., subsize) to a second size (e.g., full size).

Referring to FIG. 14B, the electronic device may be configured to identify a second moving object area 1425 that is distinguished from a background area 1423 from a second image 1421 having the second size.

Referring to FIG. 14C, the electronic device may be configured to acquire a second synthesis image 1430 by replacing the second moving object area 1425 by the first moving object area 1415.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and do not limit the components in other aspect (e.g., importance or order). It is to be understood that if an element (e.g., a first element) is referred to, with or without the term "operatively" or "communicatively", as "coupled with", "coupled to", "connected with", or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic", "logic block", "part", or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. The term "non-transitory" may refer, for example to the storage medium being a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
    memory;
    an image sensor; and
    at least one processor operatively connected to the memory and the image sensor,
    wherein the memory is configured to store instructions which, when executed, configure the at least one processor to individually or collectively control the electronic device to:

acquire, through the image sensor, a plurality of images including first images having a first size and at least one second image having a second size larger than the first size, acquire a first synthesis image by synthesizing the first images, based on synthesis area information including at least one of moving object location information or background location information, acquire, from the first synthesis image, a first moving object portion which is an image portion including a moving object, based on the synthesis area information, identify, in the at least one second image, a second moving object portion which is an image portion including the moving object, and acquire a second synthesis image by replacing the second moving object portion by the first moving object portion.

2. The electronic device of claim 1, a frame rate of the first images is higher than a frame rate of the at least one second image.

3. The electronic device of claim 1, wherein the second synthesis image comprises the first moving object portion of the first synthesis image and a background portion of the at least one second image.

4. The electronic device of claim 3, wherein the instructions, when executed, configure the at least one processor to individually or collectively controleause the electronic device to upscale the first synthesis image, and
acquire the first moving object portion from the upscaled first synthesis image.

5. The electronic device of claim 1, wherein the instructions, when executed, configure the at least one processor to individually or collectively control the electronic device to identify the moving object in at least one of the plurality of images, and
determine at least one of a frame rate, a time interval, a resolution, or a number of the first images to be used for acquisition of the first synthesis image, based on at least one of a magnitude, speed, or direction of a motion of the moving object.

6. The electronic device of claim 5, wherein the instructions, when executed, configure the at least one processor to individually or collectively control the electronic device to provide information on at least one of a frame rate, a time interval, a resolution, or the number of the first images to the image sensor.

7. The electronic device of claim 1, wherein the image sensor provides at least a part of the first images during a duration of providing a preview image, and
the at least one second image has the same size as that of the preview image.

8. The electronic device of claim 1, wherein the instructions, when executed, configure the at least one processor to individually or collectively control the electronic device to, while displaying a preview image, identify whether a slow shutter event requiring a change to a slow shutter mode requiring acquisition of the second synthesis image is detected, and
display, on a display, a graphical object for selecting or adjusting a value related to blur of the second synthesis image, based on the detection of the slow shutter event.

9. The electronic device of claim 8, wherein the instructions, when executed, configure the at least one processor to individually or collectively control the electronic device to identify whether slow-shutter photographing is selected, and acquire a plurality of images including the first images and the at least one second image, based on the selection of the slow-shutter photographing.

10. The electronic device of claim 1, wherein the image sensor is configured to output an image frame including an image and a header or footer including information about the image,
the at least one processor comprises an image signal processor, and
the image signal processor is configured to identify whether the image corresponds to the first images or the second image based on the information about the image included in the header or footer, and
change a configuration related to processing of the image according to whether the image corresponds to the first images or the second image.

11. A method for providing a slow shutter, the method comprising:
acquiring, through an image sensor, a plurality of images including first images having a first size and at least one second image having a second size larger than the first size;
acquiring a first synthesis image by synthesizing the first images;
based on synthesis area information including at least one of moving object location information or background location information, acquiring, from the first synthesis image, a first moving object portion which is an image portion including a moving object;
based on the synthesis area information, identifying, in the at least one second image, a second moving object portion in the at least one second image which is an image portion including the moving object; and
acquiring a second synthesis image by replacing the second moving object portion by the first moving object portion.

12. The method of claim 11, further comprising:
upscaling the first synthesis image; and
acquiring the first moving object portion from the upscaled first synthesis image.

13. The method of claim 11, further comprising:
identifying the moving object in at least one of the plurality of images; and
determining at least one of a frame rate, a time interval, a resolution, or a number of the first images to be used for acquisition of the first synthesis image, based on at least one of a magnitude, speed, or direction of a motion of the moving object.

14. The method of claim 11, further comprising:
while displaying a preview image, identifying whether a slow shutter event requiring a change to a slow shutter mode requiring acquisition of the second synthesis image is detected; and
displaying, on a display, a graphical object for selecting or adjusting a value related to blur of the second synthesis image, based on the detection of the slow shutter event.

15. The method of claim 11, further comprising:
receiving an image frame including an image and a header or footer including information about the image;
identifying whether the image corresponds to the first images or the second image based on the information about the image included in the header or footer; and
changing a configuration of an image signal processor related to processing of the image according to whether the image corresponds to the first images or the second image.

* * * * *